June 6, 1950  H. B. FUGE  2,510,468
TWO-SPEED MOTOR DRIVE WITH POSITIVE STOP
Filed Sept. 8, 1948

Inventor
Harry B. Fuge
By William P. Stewart
Attorney

Patented June 6, 1950

2,510,468

UNITED STATES PATENT OFFICE 2,510,468

TWO-SPEED MOTOR DRIVE WITH POSITIVE STOP

Harry B. Fuge, Somerville, N. J., assignor to The Singer Manufacturing Company, Elizabeth, N. J., a corporation of New Jersey Application September 8, 1948, Serial No. 48,214

7 Claims. (Cl. 318—224)

This invention relates to a control system and more particularly to a motor control system for driving a machine which performs a predetermined work cycle and comes to rest with a positive stop.

In systems of this type, it has heretofore been known to reduce the speed of the machine prior to stopping, so as to minimize shock. However, due to the complex mechanical speed-change devices employed, the possible speed of operation of the machine was unduly limited.

This difficulty has been largely eliminated in the present invention by employing a novel system of electrical braking involving a new and useful combination of motor elements and control units.

It is, therefore, a primary object of this invention to provide a motor control system in which the act of stopping is preceded by a reduction of the motor speed to an intermediate value by operating said motor at supersynchronous speeds to effect braking by absorption of the rotational energy as an induction generator.

A further object of this invention is to provide a simple motor system for controlling a machine throughout an operating cycle, including acceleration, deceleration and positive stop of the driven machine at a predetermined point in the cycle without the use of clutches.

A still further object of this invention is to provide a squirrel-cage induction motor which may be readily braked from high speed to low speed, said low-speed connection being productive of zero torque at standstill.

A further object of this invention is to provide a method of stopping a motor driving an inertia load by electrically braking said motor to an intermediate speed and subsequently driving into a positive stop at low speed.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
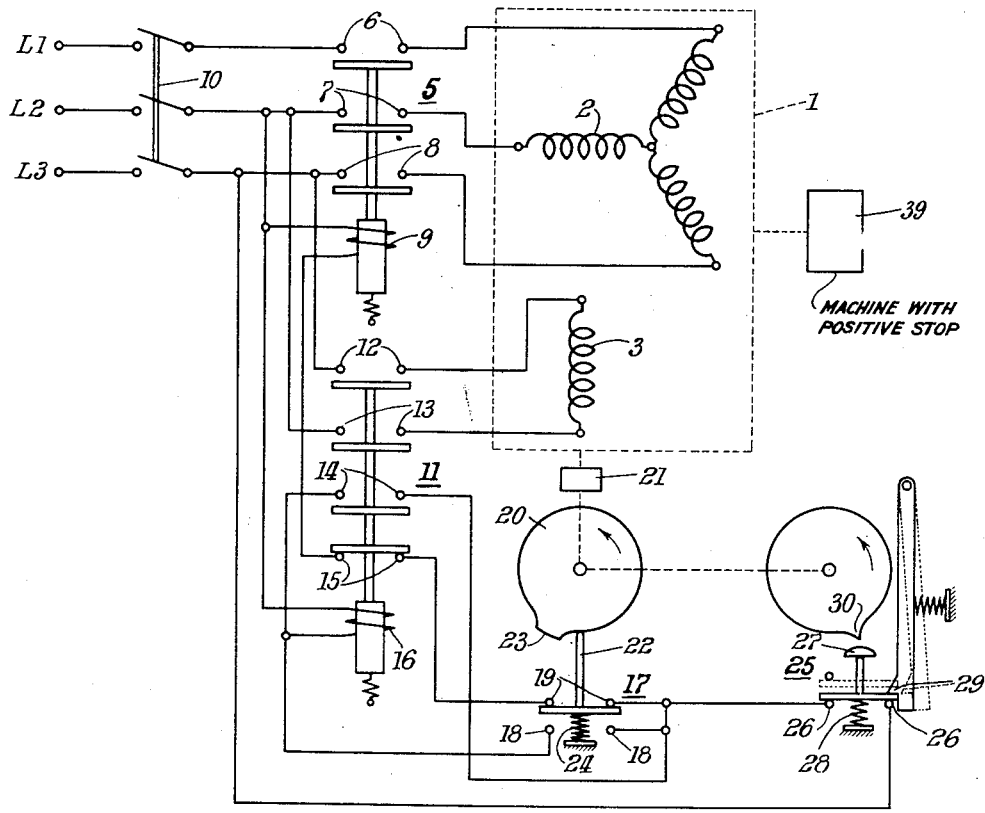

In the drawings, Fig. 1 is a schematic wiring diagram of a motor control system embodying the invention.

Figure 2:
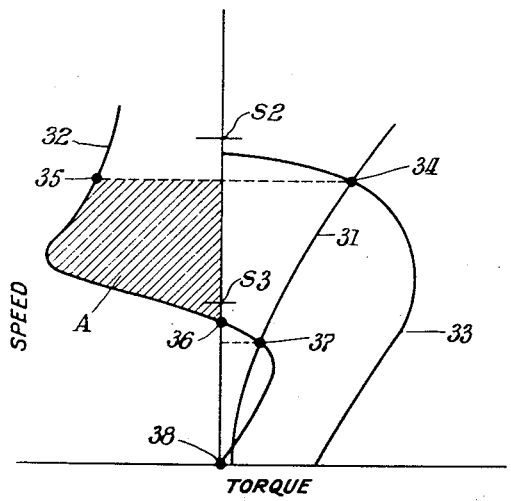

Fig. 2 shows the torque-speed relations involved in the motor of Fig. 1.

Referring to Fig. 1, a motor 1, preferably a squirrel-cage induction motor, is shown as comprising a polyphase stator winding 2 and a separate single-phase winding 3. The single-phase winding has more poles than the polyphase winding and thus provides a stator field of lower synchronous speed. Preferably, but not necessarily, the single-phase winding 3 has twice as many poles as the polyphase winding 2. A machine 39, connected to be driven by the motor 1, is adapted to drive into a positive stop at the completion of a definite work cycle. Machines of this type are well known, one being shown and described, for example, in U. S. Patent No. 542,196, July 2, 1895, to which reference may be had for a detailed description thereof.

A normally-open contactor 5, having contacts 6, 7, 8 and an operating coil 9, is employed to connect the polyphase winding 2 to a source of supply L1, L2, L3 by way of a line switch 10.

A contactor 11, having contacts 12, 13, 14, 15 and an operating coil 16, is employed to connect the single-phase winding 3 to the source L2, L3, through the line switch 10. A single-pole double-throw contactor 17 has contacts 18 and 19, the selective closure of which is determined by a cam 20 driven by the motor 1 through a speed reducer 21. It is clear that, normally, contacts 19 are closed while a follower pin 22 is in engagement with the outer periphery of the cam 20 responsive to the bias of a spring 24. However, when a rise 23 in the cam is reached by the follower, contacts 19 open and contacts 18 close.

A latch switch 25, having normally-open contacts 26, is so arranged that, when a handle 27 is pushed to close the contacts 26, as shown in the solid lines of Fig. 1, against the bias of a spring 28, a latch 29 operates to hold the contacts 26 closed until later released by a trip cam 30 which is driven by the motor 1 through the speed reducer 21.

It is clear that the cam 20 and trip cam 30 may be preadjusted angularly relative to the events of the work cycle as set up for the machine 39 so that the operator need only initiate each cycle by manually closing the switch 25, the entire system ultimately coming to rest against a positive stop of the machine 39 with the power off, ready for the next cycle.

In operation, assuming that the line switch is closed, manual closure of the switch 25 sets up the following circuit, from L2 through the coil 9, closed contacts 15, 19 and 26 to L3. This puts voltage on the coil 9, and contactor 5 operates to close contacts 6, 7 and 8, thus connecting the winding 2 to the supply lines L1, L2 and L3. The motor 1 thus comes up to speed and runs as a polyphase induction motor at a speed determined by the number of poles in the winding 2. Thus, the major events of the work cycle for the machine 39 may take place at full speed. Just prior to stopping the machine, the follower pin 22 is displaced by the rise 23 of the cam 20. The contacts 19 open and 18 close. Opening of contacts 19 opens the circuit from L2 and L3 through the coil 9, and contactor 5 returns to its normally-open position, thus disconnecting the polyphase winding 2 from the line L1, L2 and L3. Closure of contacts 18 completes a circuit from L2 through the coil 16, contacts 18 and 26 to L3. This puts voltage on the coil 16, and the contactor 11 operates to close contacts 12, 13 and 14, and to open contacts 15. Contacts 14 are sealing contacts to maintain the circuit closed after contacts 18 again open due to the rotation of the cam 20.

Operation of the contactor 11 puts a single-phase voltage from L2, L3 on the winding 3. Since this winding has a larger number of poles than the winding 2, the rotor will be running above the synchronous speed determined by the winding 3 when the shift in windings is made. This is the condition for induction generator action, and the stored rotational energy of the system is consumed in returning electrical energy to the source L2, L3. This action is accompanied by a rapid slowing down or braking of the motor until the motor is again driving the load, but now at the slower speed established by the larger pole-number winding 3.

For a 2 to 1 ratio of pole-numbers, this slower speed will be approximately one-half the full speed of the system and thus the stored rotational energy has been decreased to about one-quarter of its original value and represents the maximum energy that must be absorbed to completely stop the machine. Thus, the mechanical shock sustained when the machine runs into the positive stop is greatly decreased by the aforesaid quick speed-reduction.

Just prior to the positive stop, the trip cam 30 releases the latch 29, as shown in the dotted lines of Fig. 1 and opens the contacts 26 of the switch 25. This opens the circuit through the coil 16 and the contactor 11 returns to normal and disconnects the winding 3 from L2, L3, removing all voltage from the motor 1. Finally, a positive stop is reached, all motion ceases, and the system is returned to normal, ready for another cycle.

To assist in visualizing the torque-speed relations involved in this operation, reference to Fig. 2 shows characteristic curve 31 for the machine 39 being driven, the curve 32 for the motor with winding 2 and the curve 33 for the motor with the winding 3. Full load running speed occurs at point 34. When the single phase winding 3 is switched in, the motor exerts a negative or braking torque, as at point 35, and the motor slows down rapidly due to the braking torque in the cross-hatched area A. At the zero torque point 36, the motor again develops positive torque and stable operating point 37 is reached. After this point, the winding 3 is disconnected from the source L2, L3 and the motor runs into a positive stop. It will be seen that, even if the power is not removed from the motor before it reaches the stop, it cannot exert any driving torque at the stop because the single-phase winding 3 produces zero torque at standstill, as indicated at point 38. S2 and S3 indicate the synchronous speeds, respectively, of the motor windings 2 and 3.

A typical application for this system is in driving a group-stitch sewing machine in which a predetermined group of stitches are made and the machine then stopped. It is clear that, in order to provide the maximum useful working time, the times taken to accelerate and decelerate the machine must be minimized and that, also, the maximum speed must be as large as possible consistent with the ability of the machine parts to safely absorb the shock of stopping. As an indication of the effectiveness of the system of this invention in a particular group-stitching application, it has been determined that, ideally, if no time at all were allowed for acceleration and deceleration, 45 stitches could be sewn per cycle whereas, actually, 42 stitches were sewn. This is expressed as an effectiveness of 42/45 or 93.4%.

This system according to the invention is not to be confused with those employing conventional multi-speed motors having multi-phase windings of different pole numbers. In those systems both windings must provide starting torque and hence the simple single-axis winding employed here cannot be used. A further distinction resides in the fact that if a conventional multi-speed motor goes into stop position with the power on, the mechanical shock is augmented by the substantial standstill torque exerted, which, in the case of the system of this invention is zero.

Having thus set forth the nature of the invention, what I claim herein is:

1. A system for controlling the operation of machines, comprising an induction motor having a polyphase winding, a single-phase winding having a larger number of poles than said polyphase winding, a source of polyphase electrical energy, manually selective means for connecting said polyphase winding to said source of energy, automatic means for disconnecting the polyphase winding from said source and connecting the single-phase winding to one phase of the source of energy, and motor-operated means for disconnecting the single-phase winding after a predetermined number of revolutions of said motor.

2. A braking control system for an alternating current motor of the induction type having a squirrel cage secondary winding and two separate primary windings of different pole and phase numbers, comprising a source of energy, means for connecting the primary winding of lower pole number to said source, means for subsequently disconnecting said lower-pole number winding from and connecting the primary winding of greater pole number to said source of energy, said primary winding of greater pole number being wound on a single-phase axis so as to provide zero torque at standstill.

3. A motor control system comprising in combination, an induction motor having two separate primary windings of different pole and phase numbers, a source of electrical energy, manually operative means for connecting the primary winding of lower pole numbers to said source, first means operative from said motor to disconnect said lower pole number winding from, and to connect the higher pole number winding to said source after a predetermined number of revolutions of said motor, and second means, operative from said motor subsequent to the operation of said first means, to disconnect the motor windings entirely from said source of energy, and third means comprising a mechanical stop for stopping the motor subsequent to the operations of said first and second means.

4. In a control system for an induction motor connected to an inertia load, a source of electrical energy, a polyphase primary winding, a separate single-phase primary winding having more poles than said polyphase winding, manually operative means for connecting said polyphase winding to said source of energy for effecting normal rotation of said motor, means responsive to said motor rotation for disconnecting the polyphase winding from said source and connecting the single-phase winding to said source whereby the speed of the motor is initially greater than the synchronous speed determined by the single-phase winding so that induction generator action takes place to brake the inertia load to a lower speed.

5. In a motor control system, a source of single frequency electrical energy, an induction motor having a closed-circuited secondary winding and two electrically insulated primary windings, the first of said windings being polyphase, the second of said windings being single-phase and having a larger number of poles than said polyphase winding, manually operative means to connect the polyphase winding to said source for effecting normal rotation of the motor, means responsive to the rotation of said motor for disconnecting said polyphase winding from said source and connecting said single-phase winding to said source, and mechanical means for stopping the rotation of said motor while said single-phase winding is connected to said source.

6. In a system of control for an electric motor, a source of electrical energy, an induction motor having two separate primary windings of different phase and pole numbers, a cam driven by said motor, a first switch operated by said cam, a manually closable switch provided with a latch for maintaining its closed position, a trip member driven by said motor for releasing said latch to open said manually closable switch, means responsive to the closure of said manually closable switch for connecting one of said windings to said source, and means responsive to the operation of said first switch for disconnecting said one of said windings and connecting said other one of the windings to said source.

7. In a braking system for a polyphase induction motor, a source of electrical energy, an induction motor having a closed-circuited secondary winding and a polyphase primary winding for effecting normal rotation of said motor, a separate single-phase primary winding having a larger number of poles than said polyphase winding, means for disconnecting said polyphase winding from said source during normal rotation of said motor, and means for simultaneously connecting said single-phase winding to said source whereby said motor runs at a speed above synchronism as determined by the single-phase winding and is braked to a lower speed by the induction generator action thus produced.

HARRY B. FUGE.

REFERENCES CITED

The following references are of record in the file of this patent:

UNITED STATES PATENTS

| Number | Name | Date |
| --- | --- | --- |
| 2,269,069 | Werner | Jan. 6, 1942 |
| 2,386,009 | Smith | Oct. 2, 1945 |